Patented Apr. 18, 1939

2,155,139

UNITED STATES PATENT OFFICE 2,155,139

PROCESS OF OBTAINING A MIXTURE OF MAGNESIUM OXIDE AND CALCIUM CARBONATE FROM DOLOMITE

Walter H. MacIntire, Knoxville, Tenn., assignor to American Zinc, Lead & Smelting Company, St. Louis, Mo., a corporation of Maine No Drawing. Application February 24, 1937, Serial No. 127,565

6 Claims. (Cl. 23—201)

This invention relates to the production of a material consisting substantially of one part of magnesium oxide, three parts of calcium carbonate and a nugatory content of free lime, by the calcination of dolomite in an atmosphere of steam.

A true dolomite is a double carbonate of calcium and magnesium, bound together in a dolomite molecule $CaCO_3.MgCO_3$ and while in this combination the magnesium carbonate possesses properties at variance with the properties of other natural magnesium carbonates. In the procedures hitherto proposed for the calcination of dolomite to produce a mixture of $CaCO_3$ and $MgO$, the products have been characterized by one or both of two objectionable features, the development of a high content of "free", or caustic, lime and incomplete disruption of magnesium carbonate into magnesium oxide. By the present invention both of these deficiencies are obviated. The novel conditions prescribed by the present invention effect a disruption of the bond between the component carbonates of the dolomite and the liberated magnesium carbonate is then broken down to the oxide of magnesium at a temperature of approximately 175 degrees below that hitherto deemed essential in this operation, with the desired result, namely, a product that consists substantially of the entire original occurrence of calcium carbonate, the magnesia equivalent of the original magnesium carbonate occurrence and a meager quantity of less than one per cent of "free" lime.

Throughout the United States there are hundreds of thousands of tons of dolomite resulting as a waste product in the flotation process of separating valuable minerals (such as sphalerite for example) from the dolomite with which they are naturally associated. In the practice of the flotation process it is essential that the ore, consisting largely of dolomite with the valuable minerals attached thereto or intermingled therewith be comminuted, this comminution being such that substantial proportions of the dolomite will pass through a 100-mesh sieve. When the mineral, such as sphalerite, or zinc sulfide, is separated from the dolomite by flotation, this finely divided dolomite becomes a waste product to the extent of hundreds of thousands of tons, and one of the objects of the present invention is to convert this waste material into a calcine that consists substantially of one part of magnesia to three parts of calcium carbonate with a minimal concomitant occurrence of free lime.

Hitherto, it has been proposed to calcine lumps of dolomite in a stack at a high temperature, one sufficient to convert both of the component carbonates, $CaCO_3$ and $MgCO_3$ into their respective oxides, the liberated carbon dioxide being driven off by the hot current of combustion gases and air that pass up through the spaces between the lumps of dolomite in the stack. Moreover, at the high temperature employed, heat finds access to the lumps throughout the stack and necessarily first finds access to the surfaces of the lumps and gradually penetrates to the heart of the lumps. The result is that the first production of magnesium oxide is that which develops along with substantially equivalent quantities of calcium oxide at the surface of the lumps. Magnesium oxide, and to a lesser extent CaO also, is thus progressively formed from the outside of the lumps to their centers. It follows that the cores of the lumps are subjected to the continued high temperature for a much shorter period than are the more exterior portions of the lumps, whereas an insufficient period of exposure of the lumps to the high temperature will result in undecomposed magnesium carbonate in their centers. This continued application of high temperature to the freed calcium carbonate causes its disruption to an undesired extent. The resultant calcine is one of lumps the surfaces of which are completely converted to CaO and MgO, with indeterminate progressive variations between that result and incomplete disruption of magnesium carbonates at the centers of the lumps. It is necessary to remove the surfaces of such lumps by mechanical means facilitated by hydration of the CaO. After such manipulation, the residual portions of the lumps are comminuted.

The conversion of dolomite into an approach to a desired calcine of $CaCO_3$ and $MgO$ has also been practiced by the calcination of granular or nugget particles in rotary furnaces with a current of air passing through the tubular calcination chamber, the resultant calcine being comminuted. Finely divided dolomite, such as that proposed for use in the present invention has been considered unadapted to such rotary kiln operations, because of the high and unpermissible quantity of free lime that is engendered in the calcine.

According to the literature of the art and of the researches conducted by Gill and others of The Canadian Research Council, and by the Americans, Shaw and Bole, a temperature of 725° C. has been considered essential to effect the dissociation, or breakdown, of the magnesium carbonate component of dolomite and this temperature has been employed to produce from dolomite a product that is substantially a mixture of $CaCO_3$ and $MgO$. When this temperature is employed for an air-vented calcination of the comminuted dolomite that is especially adapted to the present invention, an undue quantity of free lime up to 9 per cent is engendered during a calcination period so brief as two hours. Hence, although previously it has been found necessary to eliminate the fines from an air-vented calcination at the prescribed temperature, the problem of the present invention was to determine how coarse the separates could be and still show an acceptable result under the conditions imposed in the present invention.

As a result of repeated and exhaustive experiments, it has been discovered that by selecting the proper temperature and the proper atmospheric current for removal of the liberated $CO_2$ and for a catalytic effect during calcination, finely comminuted dolomite (minus 100-mesh) can be successfully calcined to secure a calcine consisting substantially of one part of magnesium oxide and three parts of calcium carbonate due to the complete transition of the magnesium carbonate component of the dolomite into $MgO$, with only a nugatory dissociation of the $CaCO_3$ component into free lime, i. e., less than 1 per cent of free $CaO$ in the final product. After extended experimentation, in which currents of air, nitrogen, $NH_3$, helium, and steam, were used to remove the liberated carbon dioxide, it was found that the calcination of this finely comminuted dolomite could be effected in a current of steam at a temperature of 550° C. to produce the desired product. Selective calcination, as herein used, therefore connotes the calcination of dolomite of a selected range of fineness, at a selected range of temperature and in a selected atmosphere.

When the calcination of 100-mesh dolomite was conducted at 600° C., there was produced only a small amount of magnesium oxide when currents of either air, nitrogen, helium, or ammonia, were passed through the calcination chamber during the calcination for a period of two and one-half hours. But it was discovered that a high degree of disruption of magnesium carbonate ensued under the foregoing conditions, when steam was used in lieu of the aforementioned gases. Complete calcination of the magnesium carbonate was not effected when the temperature of 600° C. was maintained with a current of steam when the material was not agitated. But, with agitation in a current of steam at 550° C., complete decomposition of the magnesium carbonate was effected within a calcination period of two to two and one-half hours, and with the formation of less than 1 per cent of free $CaO$ in the final calcine. When separates of ⅛ to ¼ inch, ¼ to ½ inch and ½ to 1 inch were calcined at 600° C., for two and one-half hours in a current of air and with externally applied heat, the total calcination was only approximately 1 per cent in each case. With external heat, a current of steam and calcination for two and one-half hours, it was found that the calcination of the smallest of the three separates, the ⅛–¼ inch material, gives a calcination only two-thirds of that obtained from the 100-mesh material under the same conditions, and that a dolomite so comminuted as to give a material all of which will pass a ⅛-inch sieve and carry a substantial quantity of fines of the order of 100-mesh and finer can be used advantageously in the operation prescribed in the present invention.

According to the present invention, the ideal comminution of the dolomite is of minus 100-mesh fineness, although a minor portion of it may be of a somewhat coarser comminution. Disruption of the dolomitic double molecule ($CaCO_3 \cdot MgCO_3$) is then effected with a subsequential disruption of the freed $MgCO_2$ by calcining the agitated dolomite in a current of steam at a preferred temperature of from 500° C. to 600° C., for a period of one and one-half hours to two and one-half hours, as may be determined for specific dolomites. The calcination is preferably conducted in a rotary type kiln with provision for the injection of steam in a current that will sweep out and permit conservation of the evolved carbon dioxide gas.

The application of heat in the operation of the present invention may be applied externally, but the preferred method is to inject heat into a well insulated chamber by means of superheated steam by the use of a superheater placed between the origin of the steam and the calcination chamber. The superheated steam should be brought to a temperature sufficiently in excess of the desired temperature of 550° C., to offset the incidental losses of heat in the passage of the steam from the superheater into contact with the dolomite charge in the calcination chamber and to maintain the steam atmosphere of the calcination chamber at the prescribed temperature for the prescribed period during which the charge is exposed to the requisite and prescribed temperature for effecting the desired degree of calcination.

By the operation of the present invention, finely divided dolomite can be utilized in selective calcination by subjecting the dolomite to a lower temperature and for a shorter period of time than has been deemed practical heretofore. Furthermore, the present invention assures the complete disruption of the magnesium carbonate component of the finely divided dolomite with only a meager disruption of the calcium carbonate component, or calcite, or aragonite, of the dolomite and hence only a nugatory occurrence of undesired free lime (less than 1 per cent) in the finished product, whereas the finely ground dolomite waste product cannot be used to secure that result by the practice of the prior art. It will thus be seen that, by the present process, there is produced the desired dolomitic calcine, consisting substantially of one part of magnesium oxide and three parts of calcium carbonate and a minimal content of free lime and with distinct advantages, namely, utilization of a by-product raw material of a fineness not hitherto permissible or employed, a shorter calcination period, a materially lower calcination temperature effecting complete transition of the $MgCO_3$ into $MgO$, a minimal conversion of $CaCO_3$ into $CaO$, and with consequential reduction in cost.

Having thus described the invention, what is claimed is:

1. The process of producing from dolomite a mixture of magnesium oxide and calcium carbonate substantially free from lime, which consists in comminuting dolomite to pass a 100 mesh sieve and then simultaneously agitating and subjecting the same to the action of a current of steam and a temperature of from 550° C. to approximately 600° C.

2. The process of producing from dolomite a calcine of magnesium oxide and calcium carbonate substantially free from lime, which consists in comminuting dolomite to minus 100 mesh and then simultaneously subjecting the same to the action of a current of steam and a temperature of approximately 550° C., while agitating the comminuted dolomite.

3. The process of selectively calcining dolomite which consists in comminuting the dolomite to a fineness of minus 100-mesh and subjecting it to a temperature of from 550° C. to approximately 600° C., by applying heat to the exterior of the calcination chamber, while simultaneously agitating the charge and displacing inert air from the chamber by injecting a current of catalytic steam until the component magnesium carbonate is converted into MgO.

4. The process of selectively calcining dolomite which consists in comminuting dolomite to a fineness of 100-mesh and then subjecting it to heat of from 550° C. to 600° C. applied to the exterior of the calcination chamber while simultaneously agitating the charge and injecting a current of superheated steam until the component magnesium carbonate is converted into MgO.

5. The process of selectively calcining dolomite comminuted to minus 100-mesh, which consists in subjecting the same to heat from 550° C. to approximately 600° C., applied to the exterior of the calcination chamber and simultaneously injecting a current of superheated steam at a temperature sufficient to maintain the temperature of the calcination at said temperature, from 550° C. to approximately 600° C., while agitating the charge of comminuted dolomite until the component magnesium carbonate is converted into MgO.

6. The process which consists in subjecting dolomite comminuted to minus 100-mesh to the catalytic action of a current of steam at a temperature of from 550° C. to approximately 600° C., while agitating the dolomite until the component magnesium carbonate is converted into MgO.

WALTER H. MacINTIRE.